Feb. 4, 1964 A. H. CALDWELL 3,120,412

ELECTRICAL CABINET STRUCTURE

Filed Oct. 31, 1961

INVENTOR.
ANDREW H. CALDWELL
BY
J. T. Comfort
ATTORNEY

United States Patent Office 3,120,412
Patented Feb. 4, 1964

3,120,412

ELECTRICAL CABINET STRUCTURE

Andrew H. Caldwell, Roanoke, Va., assignor to General Electric Company, a corporation of New York Filed Oct. 31, 1961, Ser. No. 149,070
1 Claim. (Cl. 312—320)

This invention relates to an electrical cabinet structure having a removable cell.

An electrical cabinet normally accommodates electrical components and the electrical power connections. It is often desirable to remove the electrical components from the power connections for repair and inspection. It has been the practice to place the electrical components in removable cells which may be removed from the stationary cabinets containing the power connections. The cells must be easy to remove and replace yet must make good contact with the power connections. Heretofore it has been necessary for the person replacing the cell to use a great deal of force in removing and replacing the cell into the stationary cabinet.

It is therefore an object of this invention to provide a new and improved electrical cabinet structure having a removable cell.

Another object of this invention is to provide a new and improved electrical cabinet structure having an easily removable and replaceable cell.

Accordingly, an electrical cabinet structure constructed in accordance with the principles of this invention comprises a stationary cabinet having a recess and a removable cell therein. The stationary cabinet has at least one rail on each side of the recess. The removable cell has a plurality of rollers on each side adapted to engage the rails on each side of said stationary cabinet. The stationary cabinet has a pin on each side of the recess. A latch having a handle and two side plates is pivotly mounted on the front of the removable cell. Each of the plates is adapted to engage the pin on each side of the recess in the stationary cabinet as the cell is inserted into the stationary cabinet. The handle is pivotly mounted so that as the handle is moved toward the cell the plates engage the pins to exert a leverage to further move the cell into the stationary cabinet.

The removable cell is easily removed by pulling on the handle with a leverage exerted against the pins by the plates. Such a removable cell is easily removed from and easily replaced in the stationary cabinet.

The novel features of the invention are set forth with particularity in the appended claims. The invention itself, however, both as to its organization and method of operation, together with further objects and advantages thereof, may best be understood by referring to the following description and the accompanying drawing.

Figures 1, 2, 3:
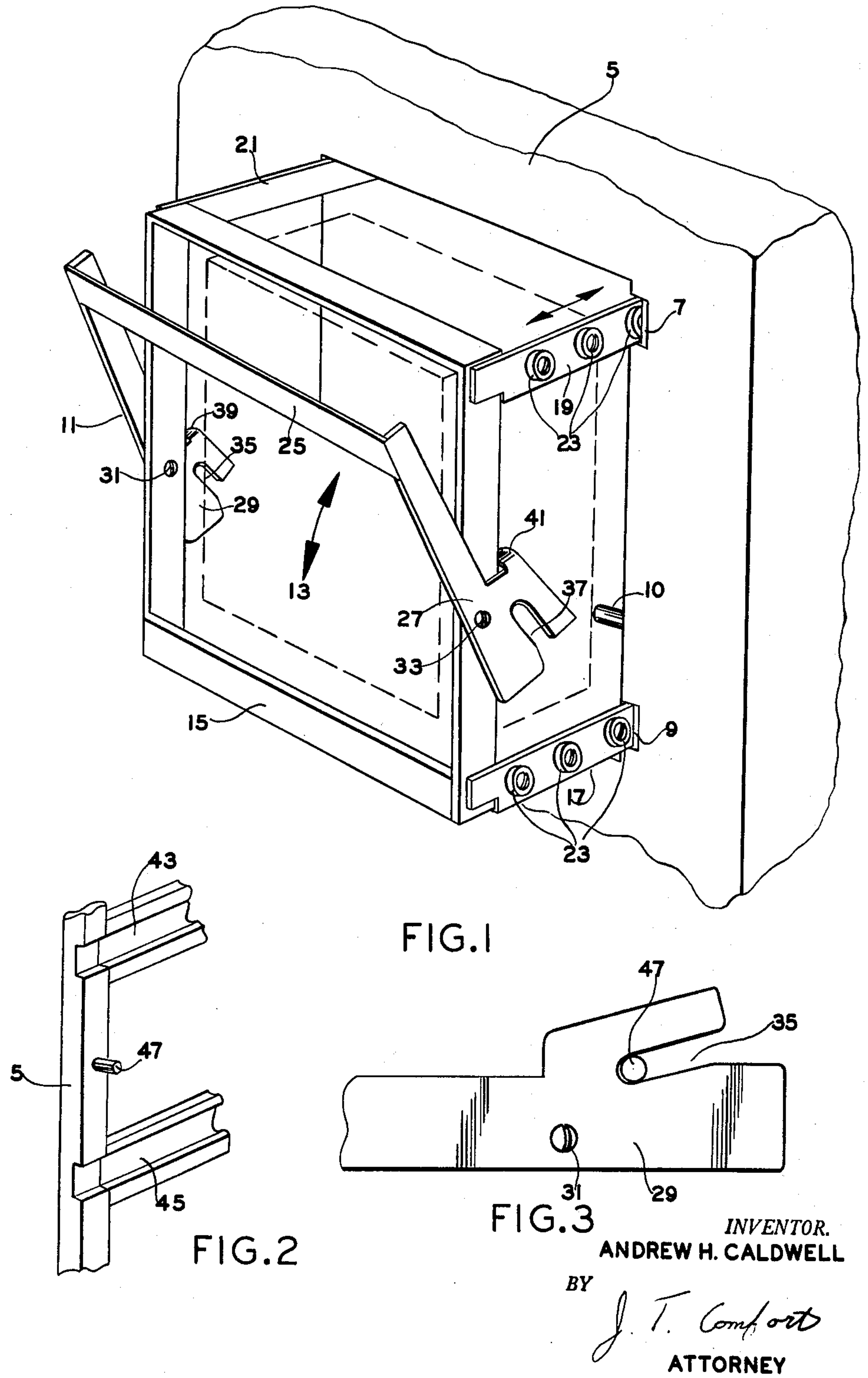
FIG. 1 shows a view of the stationary cabinet with the removable cell partially removed.
FIG. 2 shows the detail of the side rails and the stationary pin.
FIG. 3 shows a stationary pin fully engaged by a side plate.

Referring first to FIG. 1 for a description of the stationary cabinet with an easily removable cell, a portion of stationary cabinet 5 is shown with the two recessed rails 7 and 9 on the right side of the cabinet 5 and a pin 10 secured to the side of the cabinet 5. Removable cell 11 is shown partially removed from the recess in the stationary cabinet 5. The power connections (not shown) are in the back of the recess in the cabinet 5 and make connections with the electrical components (represented by a box 13 enclosed by dashed lines) in the removable cell 11. When the cell 5 is completely inserted into the recess the electrical components 13 make electrical contact with the power connections in the back of the recess.

Removable cell 11 is in the form of a rectangular frame with a front frame 15, side bars 17, 19, 21 and one side bar not shown, and a back plate not shown connected to the side bars. Each of the side bars has a plurality of rollers 23 which engage the side rails 7 and 9. A handle 25 is connected to two side plates 27 and 29 which are pivoted on pins 31 and 33 respectively and secured to the front frame 15. Each side plate 27 and 29 has a recess 35 and 37 respectively and a stop 39 and 41 respectively. The stops 39 and 41 are provided to limit the movement of the handle and side plates as the side plates pivot about pins 31 and 33.

FIG. 2 shows the two left hand rails 43 and 45 in the left hand side of stationary cabinet 5 which are not shown in the FIG. 1. Left hand pin 47 is secured to the recess in the stationary cabinet 5.

Referring back to FIG. 1, the removable cell 11 is replaced in the recess in the stationary cabinet 5 by introducing the rolls 23 into the appropriate rails and pushing the cell into the recess. The handle 25 is pulled down to the position determined by stops 39 and 41. The pins 10 and 47 are engaged in the recesses 37 and 35 respectively and the handle 25 is pushed up towards the upper portion of the front frame 15, pivoting the side plates 27 and 29 about pins 33 and 31 respectively causing a leverage to be exerted against the pins 10 and 47 to further engage the cell 11 into the cabinet 5. When the handle 25 is pushed to the front frame 15, the cell 5 is completely in the cabinet with complete electrical contact between the electrical components 13 and the power connections.

FIG. 3 shows the position of the pin 47 in the recess 35 when the handle 25 is completely pushed up to the frame 15 and the cell 11 is in the cabinet 5.

To remove the cell 11 from the cabinet 5 the handle 25 is pulled down and leverage is exerted against the pins 10 and 47 pushing the cell 11 from the stationary cabinet 5.

A stationary cabinet containing a removable cell has been described. The cell is easily removable and replaceable. A positive action is provided to insure that the cell is completely inserted in the cabinet.

While this invention has been explained and described with the aid of a particular embodiment thereof, it will be understood that the invention is not limited thereby and that many modifications will occur to those skilled in the art. It is therefore contemplated by the appended claim to cover all such modifications as fall within the scope and sipirit of the invention.

What is claimed is:

An electrical cabinet structure comprising a stationary cabinet having a recess therein, a removable cell adapted to be inserted into the recess in said stationary cabinet, said stationary cabinet having one rail at the bottom of each side of said recess and one rail at the top of each side of said recess, said removable cell having a plurality of rollers on each side adapted to engage said rails as said removable cell is inserted into the recess in said stationary cabinet, said stationary cabinet having a fixed pin on each side of the recess, a latch having a handle and two side plates, said side plates pivotly mounted on the front of said removable cell, each of said plates adapted to engage said pins as said removable cell is inserted into the recess in said stationary cabinet to exert a leverage on said pins to further move said removable cell into the recess in said stationary cabinet as said handle is moved toward said removable cell.

References Cited in the file of this patent

UNITED STATES PATENTS

| | | |
|---|---|---|
| 2,226,962 | Baird | Dec. 31, 1940 |
| 2,771,523 | Stoecklin | Nov. 20, 1956 |
| 2,944,864 | Krivulka | July 12, 1960 |
| 3,039,837 | Poe | June 19, 1962 |

FOREIGN PATENTS

| | | |
|---|---|---|
| 71,652 | France (1st addition to 1,148,565) | July 20, 1959 |